Jan. 26, 1960 E. C. ROLLINS 2,922,267
BEET TOPPER
Filed April 18, 1957 7 Sheets-Sheet 1

INVENTOR.
EUGENE C. ROLLINS
BY
ATTORNEYS

Jan. 26, 1960

E. C. ROLLINS 2,922,267

BEET TOPPER

Filed April 18, 1957

INVENTOR.
EUGENE C. ROLLINS

BY

ATTORNEYS

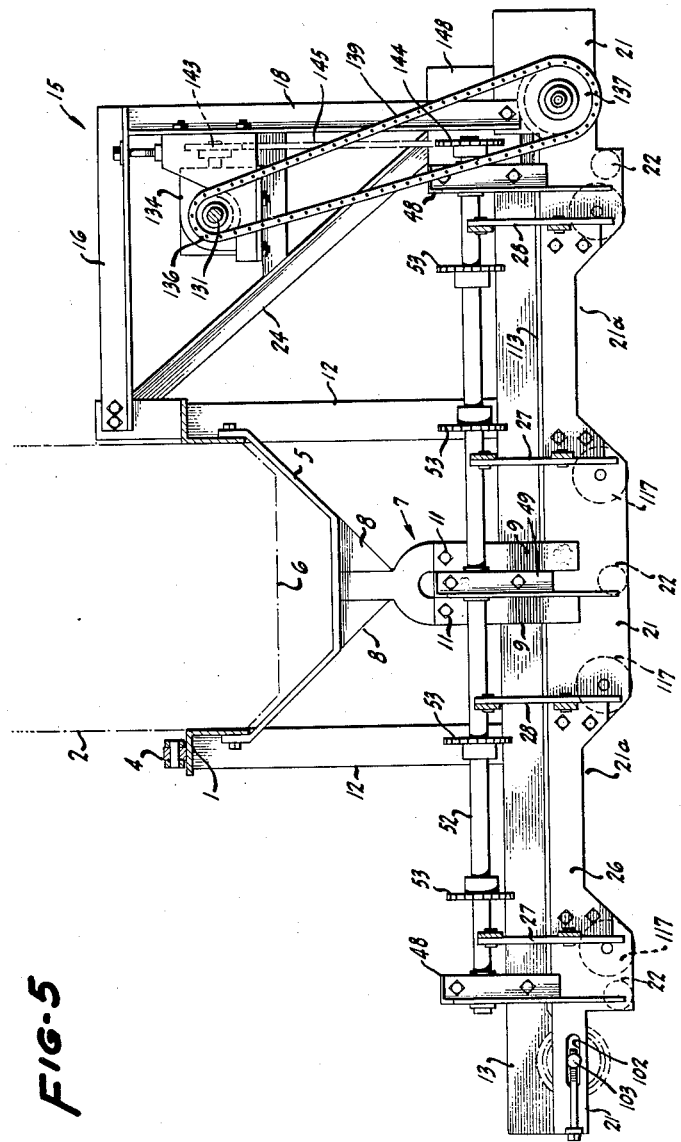

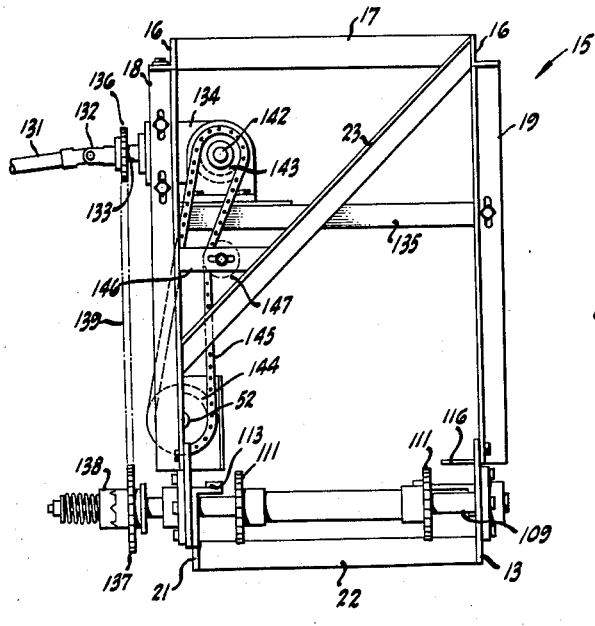

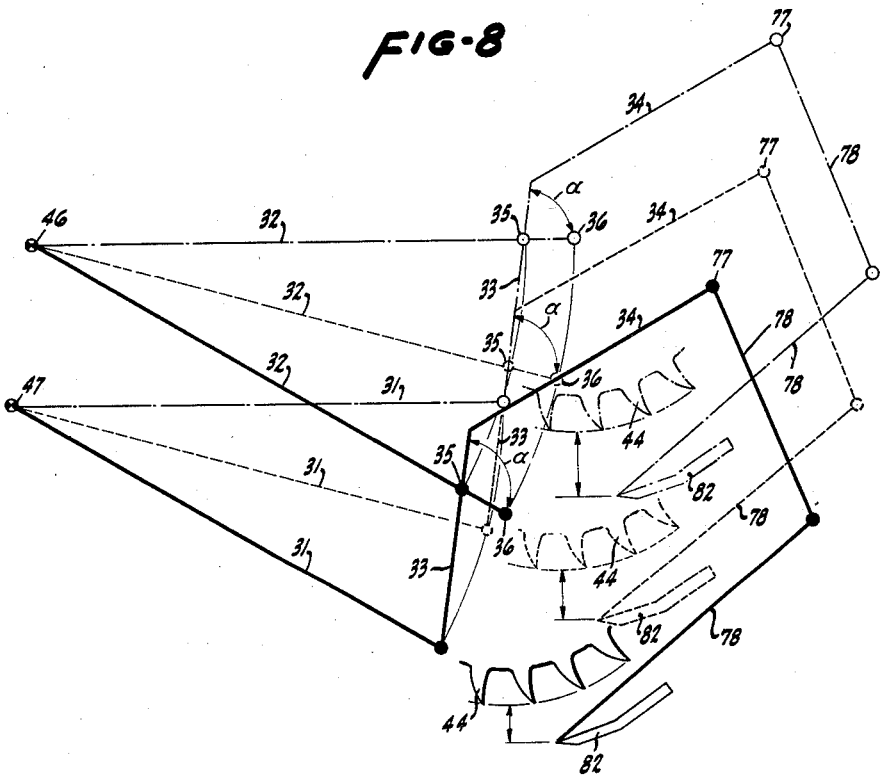

United States Patent Office 2,922,267
Patented Jan. 26, 1960

2,922,267
BEET TOPPER

Eugene C. Rollins, Ogden, Utah

Application April 18, 1957, Serial No. 653,657

19 Claims. (Cl. 56—121.46)

This invention relates to and in general has for its object the provision of means for topping crops such as sugar beets prior to harvesting.

For reasons which need not here be recited, there is a considerable variation in the extent to which the crowns of sugar beets extend above the ground level. Generally, the larger the beet the greater is the extent to which its crown extends above ground level. Also, the larger the beet, the more foliage it has around the periphery of its crown. At the topping season, a considerable quantity of this foliage, as well as vines, are strewed over the ground. Also, during the topping season, the ground and foliage are apt to be wet and, in some localities, the dirt is of a clayey consistency.

All of these factors must be taken into account in the design of a successfully operating beet topper. The peripheral foliage on the crown of a large beet necessitates that a deeper cut must be made in topping it in order to remove all of the foliage. The presence of leaves and vines on the ground, which are usually rather tough, dictates that various expedients should be resorted to in order to prevent them from fouling or jamming the machine so that the machine can be maintained in uninterrupted operation. The presence of moisture and a clayey soil are factors for both contribute to the difficulties in keeping the machine and, particularly, its moving parts clear of debris.

Consistent with these various factors, the object of this invention is the provision of a tractor supported and powered beet topper comprising: a parallelogram linkage secured at its leading end to the tractor or a frame depending therefrom; a spiked drum journaled on the trailing end of said linkage arranged to travel over a row of beets to be harvested; a beet top stripper and conveyor spud chain reeved over said drum and extending around driven sprockets mounted forwardly of the leading end of said parallelogram linkage; a V-shaped topping knife supported by said parallelogram linkage beneath the trailing end thereof and so arranged that the clearance between the knife and the lower side of the spiked drum increases in response to the upward movement of said drum; and parallel stripper bars interdigitated with the spikes of said drum on the upper side thereof for clearing said spiked drum of trash and beet tops.

Another object of this invention is the provision of a beet topper of the character above described wherein said stripper bars are supported from one of the sides of said parallelogram linkage by a crossbar disposed immediately adjacent the descending side of said spiked drum and wherein said bars decline forwardly from the zenith of the drum.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings:

Fig. 5 is an enlarged vertical section taken approximately on the section line 5—5 of Fig. 1.

Fig. 6 is an enlarged fragmentary right-hand side elevation of the transverse conveyor unit associated by the topper for conveying the beet tops to one side of the tractor.

Fig. 7 is an enlarged vertical section taken on the section line 7—7 of Fig. 4.

Fig. 8 is a diagram showing the change in the clearance between the topping knife and the spiked drum resulting from the vertical movement of the drum as it passes over beets of different heights.

*General assembly*

Figure 2:
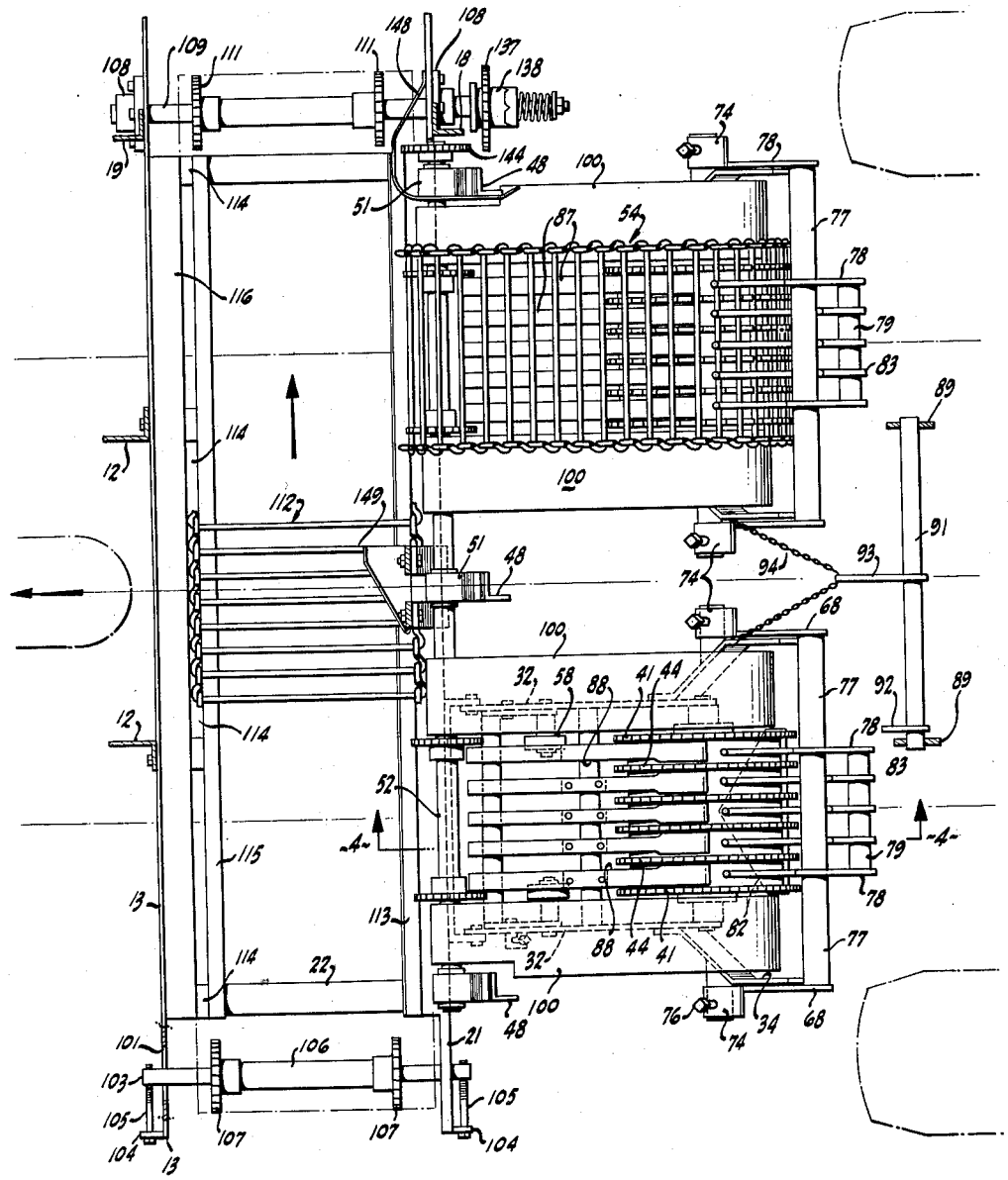
Fig. 2 is an enlarged horizontal section taken on the section line 2—2 of Fig. 1 and wherein the tractor wheels have been shown in phantom.

Generally, the topper illustrated in these figures includes a supporting frame adapted to be secured to any tractor of conventional construction, but here shown as a three wheel rig with the supporting frame secured to the lower side of the engine block. Suspended from the supporting frame are rearwardly extending opposed parallelogram linkages. Journaled to and between the trailing ends of the parallelogram linkages is a spiked beet top finding and gauging drum arranged to travel over a row of beets. Here it should be noted that, as best illustrated in Fig. 2, dual topping units can be resorted to so as to simultaneously top two rows of beets. Although the two identical units illustrated in Fig. 2 have been shown as symmetrically located with respect to the center line of the tractor, this, of course, is not essential to the construction and operation of the topper. Reeved over the trailing side of the spiked drum is an endless spud chain conveyor, the forward or leading end of the conveyor being driven by sprockets mounted on the frame immediately forward of the front or leading fixed end of the parallelogram linkage. Mounted on an extension of the trailing end of the parallelogram linkage is a knife supporting bracket surrounding the trailing side of the spiked drum and terminating adjacent the lower side thereof. Affixed to the terminal end of this bracket is a V-shaped knife which moves up and down in response to the up and down movement of the spiked drum but not to the same extent. Interdigitated with the spikes of the drum are stripper bars serving to clear the drum of trash. Disposed adjacent the leading end of the endless spud chain, which aids in stripping the spiked drum of topped beets and serves to carry them forwardly of the drum, is a second, transversely disposed endless spud chain conveyor for receiving the beet tops from the first conveyor and transporting them to one side of the tractor.

*Frame assembly*

Figure 1:
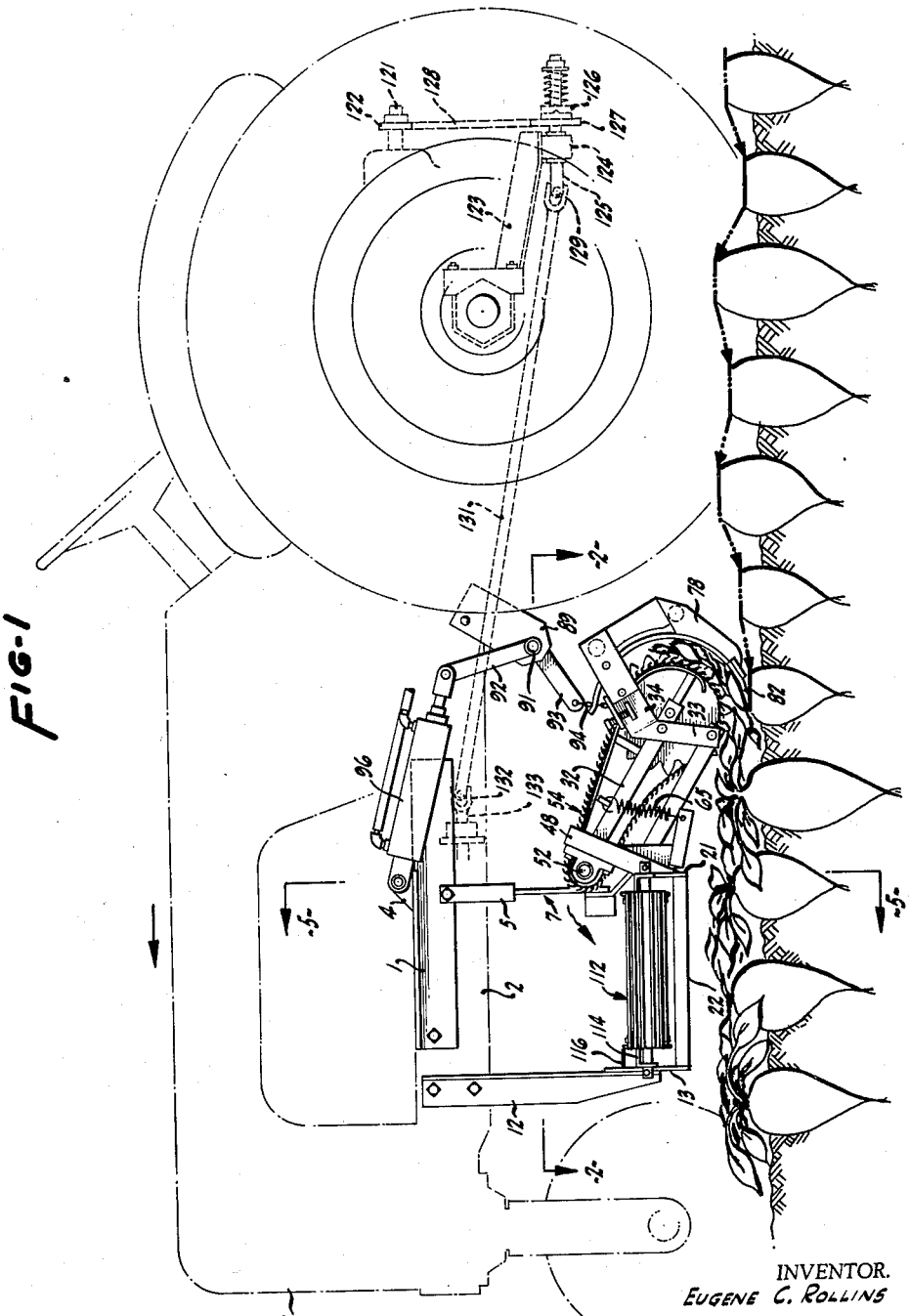
Fig. 1 is a side elevation of a beet topper embodying the objects of my invention and wherein its supporting tractor has been shown in phantom.

More particularly, and now referring to the drawings, it will be seen that the frame assembly comprises laterally opposed longitudinally extending angles 1 bolted to the lower edge of the frame 2 of the tractor 3 and provided with an upstanding lug 4 (Figs. 1 and 5). Bolted to the two opposed angles 1 and depending therefrom is a yoke 5 straddling the frame 2 of the engine. Welded to or formed integral with the yoke 5 is a depending bifurcated hanger 7 stiffened by lateral webs 8 and including rearwardly offset straps 9 secured thereto by bolts 11.

Bolted to the lower front end of the engine frame 2 is a pair of depending angles 12 symmetrically disposed with respect to the longitudinal center line of the tractor. Welded or bolted to the lower ends of the depending angles 12 is a transversely extending fabricated plate 13 provided with cutouts on either side of the longitudinal center line of the tractor, which will be more fully described presently.

Bolted to and extending outwardly from the right side of the engine frame (Figs. 5 and 6) is a rectangular subframe, generally indicated by the reference numeral 15, and including a pair of parallel, longitudinally spaced, horizontal, transversely extending angles 16, interconnected at their outer ends by a longitudinally extending cross angle 17. Welded or bolted to the outer corners of this rectangular structure are parallel depending angles 18 and 19, the lower end of the angles 19 being bolted to the transverse, fabricated plate 13 and the lower end of the depending angle 18 being bolted to an angle 21 extending transversely beneath the engine frame and secured centrally to the straps 9 of the bifurcated hanger 7. Extending across and secured to each pair of the contiguous ends of the plate 13 and angle 21 is a tubular cross brace 22. Secured across the angles 18 and 19 is a diagonally disposed bracing angle 23 (Fig. 6) and bracing the forward angle 18 is a diagonal bracing angle 24 (Fig. 5). Here it should be observed that the angle 21 is provided with cutouts 21a and that plate 13 is similarly contoured.

*Topping assembly*

Preliminarily, it should be noted that as best illustrated in Figs. 2 and 5, two topping units are here contemplated, symmetrically disposed with respect to the longitudinal center line of the tractor. However, since these units are identical except for a common power take-off located on the right-hand side of the tractor (as viewed by the tractor operator), the corresponding elements of both units will be referred to by identical or corresponding reference numerals.

Bolted to the rear face of the angle 21 in registration with one of its cutouts 21a is a plate 26 and provided at each end with vertical end flanges 27 and 28 functioning as the fixed end link of a parallelogram linkage generally referred to by the reference 29. Pivoted to each of the flanges 27 and 28 is a pair of side parallelogram links 31 and 32, in turn pivoted to a trailing end link 33 of the parallelogram linkage. Formed integral with each of the trailing end links 33 is an outwardly flaring, rearwardly inclined extension 34, which, as will presently appear, serves as knife mounts.

Mounted to and between the ends of each pair of parallelogram side links 32 rearwardly of the pivot point 35 of the trailing end link 33 is a fixed shaft 36. Journaled for rotation on each end of said shaft is a bearing 37. Attached to the flange 38 of each of the bearings 37 is drum head 39 provided on its periphery with sprocket teeth 41. Mounted to and across each associated pair of drum heads 39 are a plurality of peripherially spaced bolts 42 and secured to the bolts 42 are a plurality of annular rings 43. Formed on the outer periphery of each of the rings 43 are a plurality of radially extending beet finding and gauge spikes 44 transversely aligned with the sprocket teeth 41. Interdigitated with the annular rings 43 are cylindrical spacing rings 45 forming a continuous rigid drum structure with its associated elements.

Since the rear or trailing end of the parallelogram linkage constituted by the two pairs of fixed end links 27 and 28, side links 31 and 32, rear end 33 and shaft 36 is free to move about the forward parallelogram pivot points 46 and 47, the drum structure can, of course, move up and down.

Welded to the angle 21 are two outer rearwardly inclined angles 48 and similarly welded to the angle 21, approximately along the longitudinal center line of the tractor, is a third rearwardly inclined angle 49 identical to angles 48. Bolted to the forward face of each of the angles 48 and 49 are transversely aligned bearings 51 journaled therein is a driven shaft 52. Keyed or otherwise affixed to the shaft 52 are two pairs of sprocket wheels 53. Reeved about each of these sprocket wheels and about their associated and longitudinally aligned finding or gauging drum sprocket wheels is a detachable steel rod chain 54, generally known in the art as a spud chain, and which here serves the triple function of driving the finding and gauging drum, of stripping beet tops and trash therefrom, and of conveying said beet tops and trash away from said drum. Here it should be noted that since the gauging and finding spikes 44 of the drum are aligned with the drum sprocket teeth 41, there will be no interference between the spikes 44 and the cross rods 55 of the chain 54. It should also be here observed that the axis of the common shaft 52 lies somewhat forwardly of the pivot 46 of the parallelogram linkage so that the spud chain conveyors will deliver their load forwardly of the parallelogram linkage.

Welded to the upper side link 32 of each of the parallelogram linkage assemblies is a depending arm 56. Pivoted to and across each pair of depending arms 56 is a lever 57. Journaled on the trailing or rear end of each lever 57 is a take-up wheel 58 operating against the lower side of each of the chains 54 for the purpose of adjusting its tension. Welded to and across each transversely opposed pair of levers 57 adjacent their forward ends is a tubular tie rod 59. Extending laterally from only one of the parallelogram side links 32 is a lug 61 threaded for the reception of a stop screw 62. Similarly, the rear end of the lever 57 is provided with mating lug 63 for engaging the free end of the stop screw 62. As a result of this construction, the position of the tensioning wheel 58 can be controlled by the screw 62.

Welded to the lower end of each of the forward fixed parallelogram flanges or links 27 and 28 is a rearwardly extending finger 64 and secured thereto is a tension spring 65 fastened at its upper end to an aligned lug 66 formed integral with the upper side link 32 intermediate its ends. The springs 65 therefore serve to downwardly bias the free ends of the parallelogram linkages and the spiked finding and gauging drum associated therewith.

Provided in each of the parallelogram linkage assembly extensions 34 are lower and upper sets of threaded holes 67 and 67a, each of these sets of holes being formed on a line inclined to the longitudinal axis of its extension 34. Disposed over each extension 34 is an arm 68 provided with an upper hole 69 arranged to be selectively aligned with one of the upper holes 67a. Also provided in the arm 68 below the hole 69 is a central transverse slot 71. Extending through the upper hole 69 and selectively threaded in one of the holes 67a is a bolt 72, and extending through the slot 71 and selectively threaded in one of the holes 67 is a second bolt 73. As a result of this construction, the angularity of the upper arm 68 can be adjusted relative to the extension 34 and to the end link 33 of the parallelogram linkage. Secured, respectively, to the lower ends of the extension 34 and arm 68 are opposed lugs 74 and 75 and threaded in the lug 74 is a setscrew 76 arranged to contact the lug 75 and, therefore, to hold the arm 68 in proper relationship to the extension 34.

Welded to and between the transversely opposed arms 68 of each of the parallelogram linkage assemblies is a tubular cross-bar 77 and to each end of each bar 77 is a strap 78 extending around the rear end of the spike drum. Welded to and between each opposed set of bars 77 is a tubular stiffening bar 79. Extending over and secured to the lower free ends of each pair of transversely opposed straps 78 is knife mounting plate 81 and, detachably screwed thereto, is a V or shovel-shaped beet topping knife 82.

Welded to the tubular stiffening are a plurality of transversely spaced rod carriers 83 paralleling the straps 78. Welded to each of rod carriers 83 and to the straps 78 are guide rods 84 extending over the rear end of the spiked drum in longitudinal alignment with the channels formed by the contiguous rings of spikes 44. The guide rods 84 are free at their upper ends and serve merely to hold the beet tops, leaves and trash against the spiked drum.

Bridging each pair of opposed upper side links 32 and welded thereto is a tubular crossbar 85 and welded thereto are a plurality of upstanding T-shaped stripper bar supporting members 86. Screwed to each of the members 86 is a longitudinally extending stripper bar 87. The rear or trailing end of each of the bars 87 is interdigitated with the rows of spikes 44 beneath the upper reach of the link chain belt 54 and generally in parallelism therewith. The trailing ends of the bars 87 are arranged to wipe the drum and its spikes clear of beet tops and trash. The forward ends of the bars 87, as they leave the drum, are cut back as at 88 so as to leave substantial clearance for the downward passage of trash.

Secured to the tractor frame on opposite sides thereof is a pair of parallel brackets 89 (Fig. 1) and journaled in the lower ends thereof is shaft 91 (Fig. 2). Welded to the shaft 91 are arms 92 and 93 and secured to the arm 93 are the upper ends of hanger chains 94, the lower ends of each of these chains being connected to a lug 95 welded to one of the extensions 34 of one of the parallelogram linkage assemblies. The other arm 92 is actuated by a conventional hydraulic cylinder 96, pivotally mounted to the engine frame lug 4.

Figure 3:
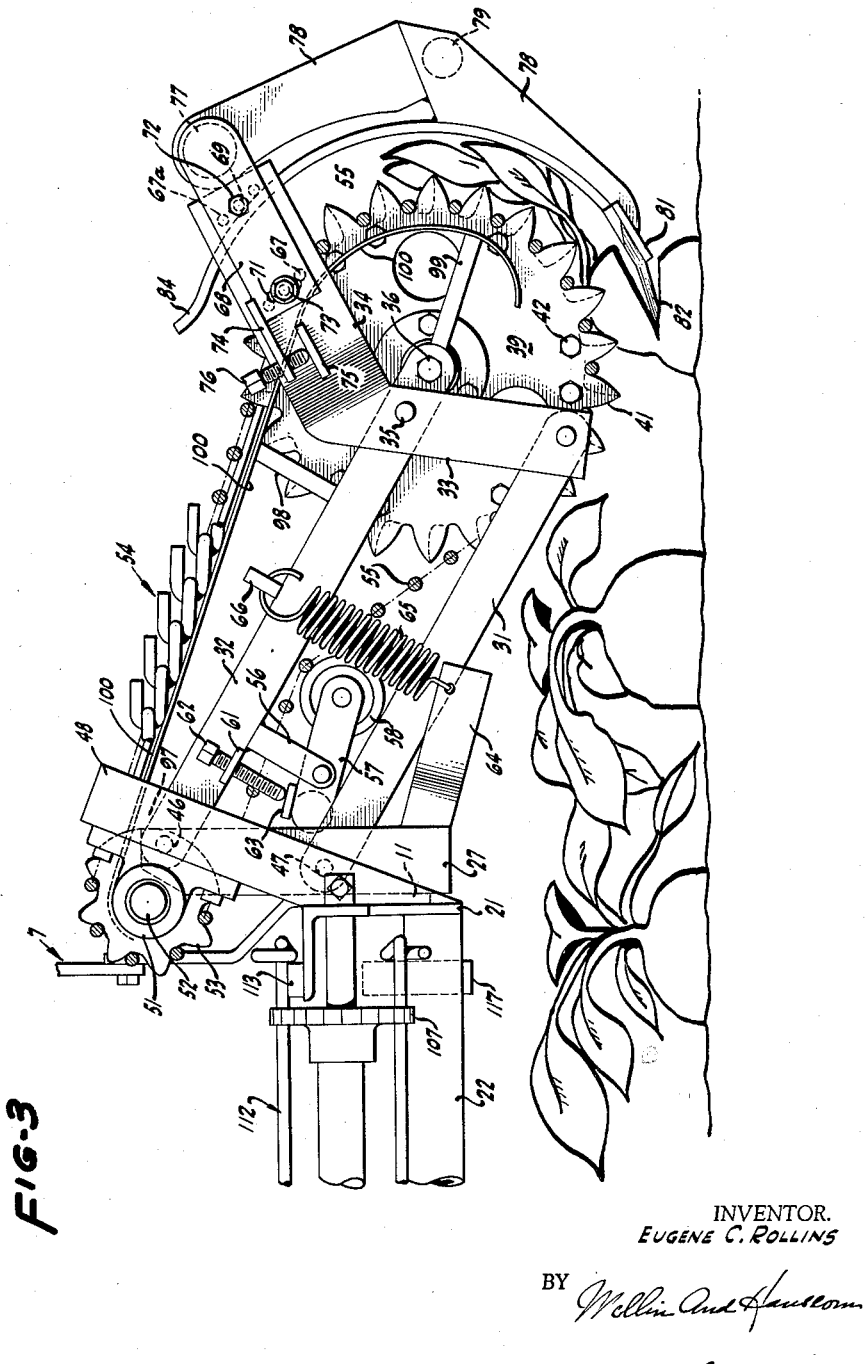
Fig. 3 is an enlarged fragmentary side elevation of the topper illustrated in Fig. 1.
Figure 4:
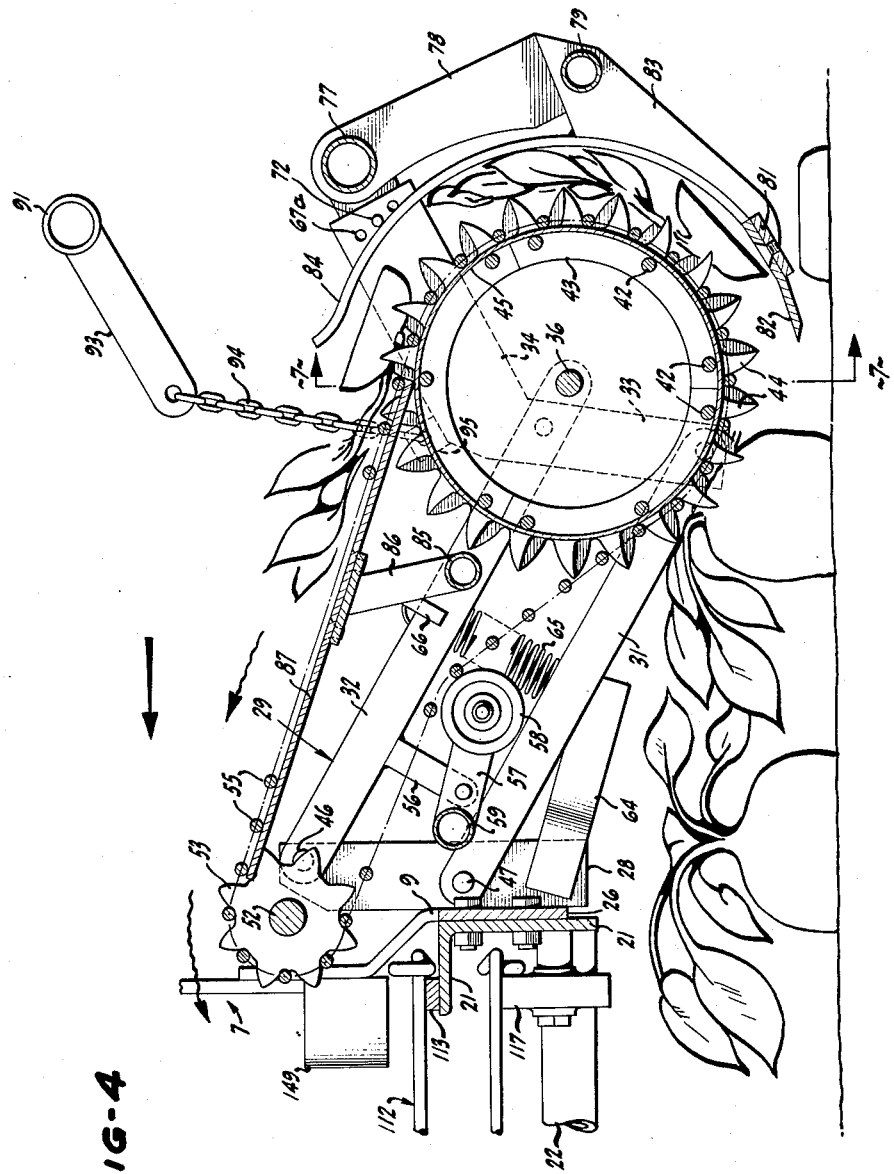
Fig. 4 is an enlarged fragmentary vertical section taken on the section line 4—4 of Fig. 2.

Formed integral with each of the upper side links 32 of the parallelogram linkage assemblies are brackets 97, 98, 99, and mounted thereon are shields 100 partially surrounding the shaft 52 at its forward or leading end and generally paralleling the upper reach of the chain belt 54 (Figs. 3 and 2). The function of these shields is to prevent any trash picked up by conveyor belt 54 from dropping into the parallelogram linkage assembly.

Another relationship which should here be noted is that the spikes of the finding drum are arranged in longitudinally spaced rows, that the pitch thereof is equal to the pitch of the drum sprocket teeth, that the drum sprocket teeth are transversely aligned with the drum spikes, and that the distance between the rods of the topping unit conveyor is equal to the pitch of the drum sprocket teeth.

*Transverse conveyor assembly*

Formed in the left end of the plate 13 and angle 21 are longitudinally aligned slots 101 and 102 and mounted therein is a fixed shaft 103. Secured to the ends of plate 13 and angle 21 are lugs 104 and extending therethrough with positive clearance are take-up bolts 105 having threaded engagement with the shaft 103. Journaled on the shaft 103 is a bearing sleeve 106 and fastened to each end thereof is a sprocket wheel 107.

Mounted on the right-hand ends of the plate 13 and angle 21 are longitudinally aligned bearings 108 and journaled therein is a shaft 109 paralleling the shaft 103. Fixed to the shaft 109 intermediate the bearings 108 are sprocket wheels 111 and reeved around the sprocket wheels 107 and 111 is a detachable link chain belt 112 which can be identical with the chain belts 54. Here it should be noted that the belt 112 is located immediately adjacent the forward end of the belt 54 and somewhat beneath it so that beet tops carried by the belt 54 can drop under the influence of gravity to the belt 112.

Mounted on the angle 21 is a trackway 113 serving to support the upper reach of the belt 112. Mounted on the plate 13 are angle brackets 114 and mounted on the brackets 114 is a trackway 115 for supporting the opposite upper reach of the belt 112. Mounted on the plate 13 in parallelism with and adjacent the forward side of the transverse conveyor belt 112 is a flat horizontal shield 116 functioning to prevent beet tops and trash from dropping between the conveyor belt and the plate 13.

Supporting the lower reach of the belt 112 are idler rollers 117 mounted on the angle 21 and plate 13.

*Power take-off*

Provided on the tractor is power take-off shaft 121 and keyed thereto is a sprocket wheel 122 (Fig. 1). Mounted on the tractor frame is a bracket 123 and fixed thereto is a bearing 124. Journaled in said bearing is a shaft 125 and keyed thereto through an intermediate overload clutch 126 is a sprocket wheel 127 lying in the plane of the sprocket wheel 122. Reeved around the sprocket wheels 122 and 127 is a sprocket chain 128. Connected to the forward end of the shaft 125 through a universal connection 129 is a forwardly extending and inclined shaft 131. Connected to the forward end of the shaft 131 through a universal connection 132 is a shaft 133 journaled in a gear box 134 (Fig. 6). As shown in Fig. 6, the gear box 134 is adjustably mounted on the vertical channel 18 and supported by an adjustable transverse channel 135 affixed thereto.

Keyed to the shaft 133 is a sprocket wheel 136 and reeved about this sprocket wheel and a sprocket wheel 137 keyed to the shaft 109 through an intermediate overload clutch 138 is a sprocket chain 139.

Journaled in the gear box 134 is a driven shaft 142 and keyed thereto is a sprocket wheel 143 (Fig. 6). Keyed to shaft 52 (Fig. 5) is a sprocket wheel 144 lying in the plane of the sprocket wheel 143 and reeved around the sprocket wheels 143 and 144 is a sprocket chain 145. Adjustably mounted on an angle 146 extending between and secured to the angles 18 and 23 (Fig. 6) is a take-up sprocket 147 engaging the chain 145. Secured to the right-hand inclined angle 48 (Fig. 2) is shield 148 surrounding the sprocket wheel 144 and its associated elements and functioning to prevent trash from falling thereon from the transverse conveyor belt 12.

Mounted on the arms 9 of the bifurcated hanger 7 is a deflector plate 149 inclined in the direction of travel of the transverse conveyor belt 112 (to the right) and serving to deflect trash forwardly away from the right-hand topping unit.

*Action of topping assembly*

In Fig. 8, three different positions of the parallelogram linkage assembly have been illustrated—the first in full lines, the second in dash lines and the third in dot-dash lines. As the parallelogram moves upwardly from its full-line position to its upper dot-dash position, the resulting decrease in the angle $\alpha$ results in an increase in the distance between the knife 82 and the drum axis 36 and the drum spikes. Since the drum spikes ride over the beet tops, it will be seen that the higher the beet top is, the deeper will be the cut taken by the knife.

*General operation of machine*

Generally, as the two spiked drums traverse over two transversely spaced rows of beets, their spikes travel over the beet tops. The rate of rotation of the drums is so adjusted that when the drum is directly over a beet top, there is no relative movement between the drum and the beet in a horizontal direction. At this point the topping knife severs the beet top from the beet. The beet top and some trash are then conveyed by the link chain belt over the rear side of the spiked drum and are retained thereon by the guide rods 84. As the belt diverges from the drum, it strips the beet tops and trash therefrom, this action being augmented by the stripper bars which are interdigitated at their rear ends with the rows of drum spikes. As the beet tops and trash reach the cut-out portions of the stripper bars, some trash (leaves and vines) will fall through the channels formed by adjacent stripper bars and become lodged on the tubular crossbar which supports the stripper bars. However, such trash is prevented from accumulating on the crossbar for the crossbar holds the trash immediately adjacent the descending side of the spiked drum and the spikes of the drum serve to disintegrate the trash and pull it down free and clear of the crossbar. The location of the crossbar at a point immediately adjacent the descending side of the drum is therefore of considerable importance. Likewise, the provision of channels of substantial width between the stripper bars is of importance for otherwise some trash would become lodged between the stripper bars and operate to foul the machine.

The spiked drum conveyor belt then deposits its load of beet tops onto the transverse belt and the latter belt dumps its load to one side of the tractor.

In conclusion, it is to be observed that the features of primary importance in my harvester are:

The mounting of the spiked finding and gauging drum on a rearward extension of the upper side arm of the parallelogram linkage and the mounting of the topping knife on an upward extension of the rear end link of the parallelogram linkage, thereby to enable a greater cut to be taken automatically on the larger beets.

The use of a V or shovel-shaped knife, whereby trash is deflected to one side or the other of the spiked drum and hang up of trash thereon, is minimized.

The use of a chain link conveyor reeved about the rising side of the spiked finding and gauging drum for serving the double purpose of conveying the beet tops from the topping knife over the rising side of the drum and assisting in stripping the drum of such beet tops and trash at the point where the belt diverges from the drum and then conveying such tops and trash to the transverse conveyor.

The use of stripper bars interdigitated at their trailing ends with the rows of spikes carried by the finding and gauging drum, and provided forwardly thereof with longitudinal cutouts on either side thereof to form intervening channels, for the passage of trash, whereby the trailing ends of the stripper bars serve to strip or clear the drum and its spikes of beet tops and trash and whereby fouling of the stripper bars forwardly of the drum is avoided.

The feature of mounting the stripper bars on a crossbar located immediately adjacent the descending side of the gauging drum, whereby the spikes of the drum can disintegrate any trash falling through the stripper bar channels and pull such disintegrated trash downwardly and out of the way to thus avoid the fouling or jamming of the machine at this point.

The provision of lateral shields adjacent the finding and topping unit to prevent trash falling from the unit from fouling the lower reach of the topping unit conveyor.

I claim:

1. A beet topper comprising: a tractor; a parallelogram linkage including a forward link rigidly fixed to said tractor, upper and lower rearwardly extending side links and a rear or trailing link, said upper side link being formed with a rearward extension and said trailing link being formed with an upward extension; a spiked beet top finding and gauging drum mounted on said rearward extension; a topping knife supported from said upward extension adjacent the lower rising side of said drum; and means for rotating said drum.

2. A beet topper such as defined in claim 1 wherein said finding and gauging drum is provided at its ends with sprocket teeth; wherein driven sprocket wheels are mounted on said tractor forwardly of the forward end of said parallelogram linkage; and wherein a rod chain link belt is reeved over said drum in operating engagement with its sprocket teeth and over said sprocket wheels.

3. A beet topper such as defined in claim 2 wherein the spikes of said drum are arranged thereon in longitudinally spaced rows and wherein the pitch of said spikes is equal to the pitch of said sprocket teeth and wherein said spikes are in lateral alignment with said teeth.

4. A beet topper such as defined in claim 3 wherein the transverse distance between the rods of said rod chain link belt is equal to the pitch of said sprocket teeth.

5. A beet topper such as defined in claim 2 wherein transversely spaced, longitudinally extending stripper bars are carried by said parallelogram linkage with their trailing ends interdigitated with the spikes of said drum on the upper descending side thereof.

6. A beet topper such as defined in claim 2 wherein said parallelogram linkage supports a crossbar immediately adjacent the descending side of said drum and in parallelism therewith; and wherein said crossbar supports stripper bars extending rearwardly into interdigitating relationship with said rows of spikes adjacent the upper descending side of said drum.

7. A beet topper such as defined in claim 2 wherein said topping knife is forwardly convergent.

8. A topper such as defined in claim 2 wherein horizontally extending shield plates are mounted on said parallelogram linkage over the outer edge of the lower reach of said rod chain belt.

9. In a beet topper: a frame; a vertically adjustable topping knife; a vertically adjustable finding drum interconnected with said knife for varying the position of the latter relative to said drum in response to the vertical movement of said drum, said finding drum including a multiplicity of top engaging spikes; an endless chain belt partially encompassing said drum; and means for driving said chain belt.

10. In a beet topper: a frame; a vertically adjustable topping knife; a vertically adjustable finding drum interconnected with said knife for varying the position of the latter relative to said drum in response to the vertical movement of said drum, said finding drum including a multiplicity of top engaging spikes; and an endless chain belt partially encompassing said drum and provided with passageways for allowing protrusion and retraction of said spikes as the drum is rotated, said belt serving as a drive for rotating said drum and for stripping beet tops therefrom.

11. In a beet topper: a main frame; a vertically adjustable topping knife; a vertically adjustable spiked finding drum interconnected with said knife for varying the position of the latter relative to said drum, said finding drum being provided at its ends with sprocket teeth; driving sprocket wheels mounted on said frame forwardly of said finding drum; and an endless rod chain belt reeved over said drum in operating engagement with its said sprocket teeth and over said sprocket wheels.

12. In a beet topper as defined in claim 11 wherein the spikes of said drum are arranged thereon in longitudinally spaced rows and wherein the pitch of said spikes is equal to the pitch of said sprocket teeth and wherein said spikes are in lateral alignment with said teeth.

13. In a beet topper as defined in claim 12 wherein the longitudinal distance between the rods of said endless chain link belt is equal to the pitch of said sprocket teeth.

14. In a beet topper: a main frame; a finding drum frame pivoted to the main frame for generally up and down movement about a generally transverse horizontal axis; a spiked finding drum rotatably carried at the outer portion of said finding drum frame; a topping knife disposed adjacent the lower portion of said finding drum and connected with said finding drum frame for positioning thereby; means for driving said finding drum; transversely spaced, longitudinally extending stripper bars attached to said finding drum frame with their trailing ends interdigitated with the spikes of said drum on the upper descending side thereof; and an endless link belt partially encompassing said finding drum serving as a conveyor to strip beet tops from said drum.

15. In a beet topper: a main frame; a finding drum frame pivoted to the main frame for generally up and down movement about a generally transverse horizontal axis; a spiked finding drum rotatably carried at the outer portion of said finding drum frame; a topping knife disposed adjacent the lower portion of said finding drum and connected to said finding drum frame for positioning thereby; means for driving said finding drum; transversely spaced, longitudinally extending stripper bars attached to said finding drum frame with their trailing ends interdigitated with the spikes of said drum on the upper descending side thereof; and endless belt means mounted on said finding drum frame to convey the tops from said finding drum.

16. In a beet topper: a main frame; a finding drum frame pivoted to the main frame for generally up and down movement about a generally transverse horizontal axis; a spiked finding drum rotatably carried at the outer portion of said finding drum frame; a topping knife disposed adjacent the lower portion of said finding drum and connected with said finding drum frame for positioning thereby; means for driving said finding drum; a transverse cross member formed integral with said finding drum frame closely adjacent to the spikes of said finding drum; and transversely spaced, longitudinally extending stripper bars attached to said cross member with their trailing ends interdigitated with the spikes of said drum on the upper descending side thereof; and an endless link belt partially encompassing said finding drum and serving as a conveyor to deliver tops from said drum.

17. In a beet topper: a frame; an upper arm pivoted thereto for generally up and down swinging about a generally transverse axis; a beet engaging spiked finder drum carried at the outer portion of said arm; means to drive said finding drum; a topping knife disposed adjacent the lower portion of said finding drum; a lower arm pivoted to said frame and disposed below said upper arm and connected at its outer portion by a link for movement in a direction substantially parallel to and in response to the up and down swinging of said upper arm; said link extending upwardly and rearwardly of said finding drum; and a topping knife supported by said link beneath said finding drum.

18. In a beet topper: a main frame; a finding drum frame pivoted to the main frame for generally up and down movement about a generally transverse axis; a spiked finding drum rotatably mounted to the outer portion of said finding drum frame; an endless chain belt driving means partially encompassing said drum; a vertically adjustable topping knife disposed adjacent the lower portion of said drum; and means to vary the distance between said drum and said knife in response to the vertical movement of said drum.

19. A beet topper adapted to be mounted under the belly of a tractor, said beet topper comprising a topper frame adapted to be attached to the tractor main frame; power lift means attached to the said tractor main frame; a topping knife movably carried by said topper frame; a beet engaging finding unit interconnected with said knife for controlling the position of said knife; an endless chain belt driving means partially encompassing said drum; and means connecting said power lift means to said drum, said knife and said chain unit for raising and lowering said drum and said knife into topping position.

References Cited in the file of this patent

UNITED STATES PATENTS

| | | |
|---|---|---|
| 1,369,721 | Wilson | Feb. 22, 1921 |
| 1,651,030 | Kowalsky | Nov. 29, 1927 |
| 2,212,751 | Powers et al. | Aug. 27, 1940 |
| 2,261,324 | Zuckerman et al. | Nov. 4, 1941 |
| 2,478,877 | Smith | Aug. 9, 1949 |
| 2,660,853 | Altgelt | Dec. 1, 1953 |

FOREIGN PATENTS

| | | |
|---|---|---|
| 679,969 | Great Britain | Sept. 24, 1952 |
| 1,031,874 | France | June 26, 1953 |